May 9, 1950 — B. S. MEAD — 2,506,839
FISH STRINGER
Filed Nov. 10, 1948

B. S. Mead
INVENTOR
BY C. A. Snow & Co.
ATTORNEYS.

Patented May 9, 1950

2,506,839

UNITED STATES PATENT OFFICE 2,506,839

FISH STRINGER

Benjamin S. Mead, Oakland, Iowa

Application November 10, 1948, Serial No. 59,241

2 Claims. (Cl. 224—7)

This invention relates to fish stringers used by fishermen in stringing the caught fish.

By way of background, it might be stated that in known fish strings or fish stringers, it is necessary to remove the fish from the string over the needle which has been used to thread the fish onto the string. When removing fish from the string in this manner, the gills of the fish are usually torn and the fish disfigured. It also frequently happens that the fish slide from the string and escape.

It is therefore the primary object of the present invention to provide a removable stop on one end of the string which will when in position, prevent the fish from sliding over the string to be released.

Another important object of the invention is to provide a removable stop in the form of a clamp which may be readily and easily released leaving one end of the string free to permit the fish to be readily slid from the string without the danger of tearing or mutilating the fish in any way.

Another object of the invention is to provide a pivoted clamp including jaws having means to securely grip the string to prevent movement of the clamp on the string under normal conditions.

A still further object of the invention is the provision of means to distribute the strain directed to the clamp by the weight of the fish held on the string, throughout the entire length of one section of the clamp, thereby relieving the jaws of the clamp of undue strain when a great number of fish are placed on the string causing excessive strain to be directed to the clamp.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
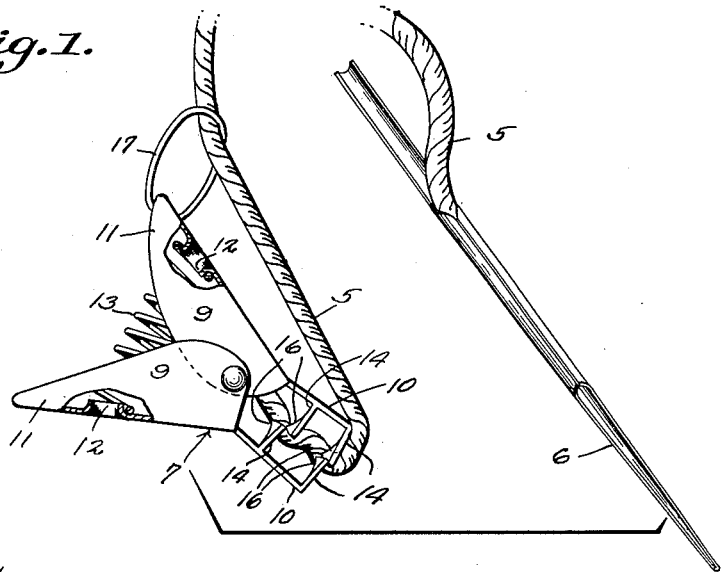
Figure 1 is an elevational view of a stop constructed in accordance with the invention illustrating the stop as secured to one end of the string of the device.
Figure 2:
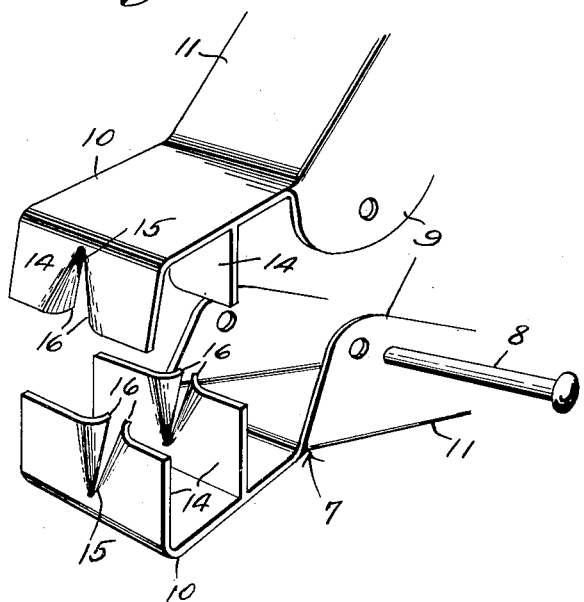
Fig. 2 is a perspective view of the jaws of the device in a non-assembled position.
Figure 3:
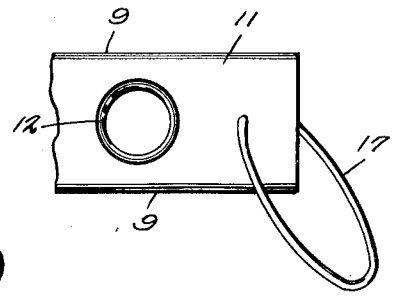
Fig. 3 is an enlarged fragmental elevational view of one finger piece of the clamp, illustrating the ring as secured thereto, through which the string passes.

Referring to the drawing in detail, the reference character 5 indicates the string or cord of the usual fish stringer, to one end of which is attached the needle 6 which is usually passed through the gills of a fish in threading fish on the string 5.

At one end of the string 5 is the stop indicated generally by the reference character 7, which stop embodies a pair of pivotally connected members connected by means of the pin 8, the pin 8 passing through lining openings in the flanges 9 of the pivoted members of the stop. Each of the pivoted members of the stop includes a jaw section 10 and a finger piece 11, the jaws and finger pieces of the members being arranged at oblique angles with respect to each other, so that the finger pieces will be extended away from each other, to be gripped by the fingers of the person operating the clamp, in opening the jaws of the clamp.

Portions of the finger pieces are stamped inwardly providing annular flanges 12 around which the end coils of the spring 13 are positioned to hold the spring in position. It will also be seen that this spring acts to normally urge the finger pieces of the members away from each other forcing the jaws together.

Each of the jaws 10 is formed with spaced inwardly extended flanges 14 having slots 15 formed intermediate the side edges thereof, the slots 15 extending inwardly from the free longitudinal edges of the flanges, portions of the flanges being curved rearwardly providing string-engaging jaws 16.

It will be seen by examining Fig. 1 of the drawing, that the jaws of the pivoted members of the stop are so arranged that the flanges and jaws of one member move in parallel spaced relation with the jaws of the adjacent member, to cause a twisting of the string positioned between the jaws of the members of which the stop is constructed to securely hold the string against slipping.

It will also be noted that the jaws 16 are curved inwardly and any strain directed to the string or cord 5 will tend to cause the cord or string to be wedged between the jaws 16.

As clearly shown by Fig. 1 of the drawing, a ring indicated by the reference character 17 is passed through an opening formed adjacent to the rear end of one of the members of the stop, and through which ring the string or cord 5 is passed to relieve the jaws 16 of undue strain directed thereto which might cause the jaws to open. By threading the string or cord 5 through the ring 17, it will be obvious that strain directed to the jaws will be distributed throughout the length of the jaws relieving the jaws of any strain which might cause the opening of the jaws to release the string.

From the foregoing it will be seen that due to the construction shown and described, when it is desired to remove the fish from the string, it is only necessary to remove the stop, whereupon the fish will slide from the string.

Having thus described the invention, what is claimed is:

1. In a fish stringer, having means for threading fish thereon, by means of which fish are threaded on the string, a stop removably secured on the opposite end of the string normally holding the fish on the string against displacement, said stop embodying members pivotally connected intermediate their ends, providing finger pieces and spring-pressed jaws, spaced flanges on the jaws, the flanges of one jaw extending towards the flanges of the cooperating jaw, said flanges having slots extending inwardly from the longitudinal edges thereof at the center of the flanges, portions of the flanges at the slots being curved rearwardly providing gripping edges and a spring normally urging the jaws towards each other.

2. In a fish stringer, having means for threading fish thereon, by means of which fish are threaded on the string, a removable stop positioned on the opposite end of the string, said stop retaining fish on the string against displacement, said stop embodying pivotally connected jaws, the jaws embodying cooperating flanges, the flanges of one jaw extending towards the flanges of the other jaw, said flanges having slots, portions of the slots being extended rearwardly providing string engaging edges the slots being substantially V-shaped whereby the string is wedged towards one end of the slots gripping the string.

BENJAMIN S. MEAD.

REFERENCES CITED

The following references are of record in the file of this patent:

UNITED STATES PATENTS

| Number | Name | Date |
|---|---|---|
| 109,563 | Walton | Nov. 22, 1870 |
| 1,397,199 | Barneck | Nov. 15, 1921 |
| 1,423,203 | Fiske | July 18, 1922 |
| 1,547,314 | Frankel | July 28, 1925 |
| 1,779,442 | Mueller | Oct. 28, 1930 |